United States Patent [19]
Kamiya

[11] Patent Number: 5,809,335
[45] Date of Patent: Sep. 15, 1998

[54] DATA TRANSFER APPARATUS CAPABLE OF HANDLING DMA BLOCK TRANSFER INTERRUPTIONS

[75] Inventor: Yasuaki Kamiya, Hamamatsu, Japan

[73] Assignee: Yamaha Corporation, Hamamatsu, Japan

[21] Appl. No.: 542,097

[22] Filed: Oct. 12, 1995

[30] Foreign Application Priority Data

Oct. 13, 1994 [JP] Japan ................................ 6-274428

[51] Int. Cl.⁶ .................................................. G06F 13/28
[52] U.S. Cl. ........................ 395/842; 395/737; 395/848; 395/860; 395/843
[58] Field of Search .................................. 395/800, 250, 395/200.07, 200.7, 842, 872, 848, 860–861, 868, 864, 879, 729, 732, 566, 737, 741, 733, 843

[56] References Cited

U.S. PATENT DOCUMENTS

| | | | |
|---|---|---|---|
| 4,272,815 | 6/1981 | Kadowaki et al. | 395/842 |
| 4,467,411 | 8/1984 | Fry et al. | 395/250 |
| 4,672,613 | 6/1987 | Foxworthy et al. | 371/40.1 |
| 4,689,767 | 8/1987 | Stevenson et al. | 395/250 |
| 4,782,439 | 11/1988 | Borkar et al. | 395/843 |
| 5,111,425 | 5/1992 | Takeuchi et al. | 395/842 |
| 5,151,999 | 9/1992 | Marzucco et al. | 395/800 |
| 5,179,709 | 1/1993 | Bailey et al. | 395/843 |
| 5,297,242 | 3/1994 | Miki | 395/842 |
| 5,375,218 | 12/1994 | Umeda | 395/842 |
| 5,386,532 | 1/1995 | Sodos | 395/842 |
| 5,438,666 | 8/1995 | Craft et al. | 395/842 |
| 5,613,162 | 3/1997 | Kabenjian | 395/842 |

FOREIGN PATENT DOCUMENTS

| | | |
|---|---|---|
| 05-046531 | 8/1991 | Japan . |
| 08-172535 | 12/1994 | Japan . |

*Primary Examiner*—Meng-Ai T. An
*Attorney, Agent, or Firm*—Pillsbury Madison & Sutro LLP

[57] ABSTRACT

A method and a data transfer apparatus capable of handling DMA block transfer interruptions are provided. The data transfer apparatus includes a plurality of direct memory access (DMA) channels each having different priorities and at least one backup channel information memory for saving control information necessary for a restart of an interrupted DMA transfer through one of the DMA channels. The data transfer apparatus further includes a control means responsive to transfer commands which command DMA transfers through the DMA channels. In addition, the control means executes various interrupt handling steps when a transfer command interrupts an execution of a DMA transfer through one of the DMA channels having a lower priority than the priority of the DMA channel used by the interrupting transfer command, so that an interruption of an important data transfer can be prevented.

5 Claims, 11 Drawing Sheets

$5,809,335$

DATA TRANSFER APPARATUS CAPABLE OF HANDLING DMA BLOCK TRANSFER INTERRUPTIONS

BACKGROUND OF THE INVENTION

1. Field of the Invention

This invention relates to a data transfer apparatus having a plurality of DMA (Direct Memory Access) channels, and more particularly to a data transfer apparatus which is capable of carrying out interruption/restarting of DMA block transfer in an efficient and prompt manner.

2. Prior Art

In a game machine or the like, it is generally required that picture data and/or sound data are frequently written into or read out of a memory. To reduce the burden on a CPU of the game machine or the like, data transfer between external modules such as memories is generally carried out by means of DMA (Direct Memory Access) transfer.

A conventional data transfer apparatus which has a function of carrying out DMA block transfer is provided with a plurality of DMA channels, and operates such that data of one of the DMA channels which receives the earliest starting command is transferred first, and when a command for DMA block transfer through one or more other DMA channels is issued during the DMA block transfer through the one DMA channel, the other DMA channel or channels are kept waiting irrespective of priorities given to the DMA channels. Only after completion of the DMA block transfer through the one DMA channel, the DMA block transfer or transfers through the other DMA channel or channels are carried out according to the priorities given to the DMA channels.

According to the conventional data transfer apparatus, however, in the case where picture data and/or sound data which should be continuously transferred become small in residual amount and hence the supplement of new necessary data is urgently required to prevent the data transfer from being interrupted, DMA block transfer of the necessary data has to be suspended if the DMA channels concerned are in contention, leading to interruption of the transfer of the picture data and/or sound data.

SUMMARY OF THE INVENTION

It is an object of the invention to provide a data transfer apparatus which is capable of carrying out DMA block transfer of data which has a high degree of urgency in a prompt and efficient manner without interruption.

To attain the above object, the present invention provides a data transfer apparatus comprising:

a plurality of DMA (Direct Memory Access) channels having respective different priorities imparted thereto; and control means responsive to a command for a DMA transfer through one of the plurality of the DMA channels which is issued during execution of a DMA transfer through another one of the plurality of the DMA channels which is lower in priority than the one DMA channel, for causing interruption of the DMA transfer through the another one DMA channel and for causing execution of the DMA transfer through the one DMA channel preferentially of the DMA transfer through the another one DMA channel.

Preferably, the data transfer apparatus includes at least one backup channel corresponding to part of the plurality of the DMA channels, for saving control information necessary for a DMA transfer through one of the plurality of the DMA channels which corresponds to the at least one backup channel and is lower in priority than the at least one backup channel when the DMA transfer through the corresponding one DMA channel is interrupted, and wherein the control means is responsive to a further command for a DMA transfer through the corresponding one DMA channel during the interruption of the DMA transfer through the corresponding one DMA channel, for causing execution of a DMA transfer through the at least one backup transfer prior to execution of the DMA transfer through the corresponding one DMA channel.

In a preferred embodiment of the invention, the at least one backup channel comprises a plurality of backup channels corresponding, respectively, to the plurality of the DMA channels, exclusive of one of the plurality of the DMA channels which has the highest priority.

In another preferred embodiment of the invention, the plurality of the DMA channels are divided into at least two groups, the at least one backup channel comprising at least two backup channels corresponding, respectively, to the at least two groups.

In a further preferred embodiment of the invention, the plurality of the DMA channels are divided into at least two groups, exclusive of one of the DMA channels which has the highest priority, the at least one backup channel comprising at least two backup channels corresponding, respectively, to the at least two groups exclusive of the one DMA channel having the highest priority.

The above and other objects, features, and advantages of the invention will be more apparent from the following detailed description taken in conjunction with the accompanying drawings.

DETAILED DESCRIPTION

The invention will now be described in detail with reference to the drawings showing preferred embodiments thereof.

Figure 1:
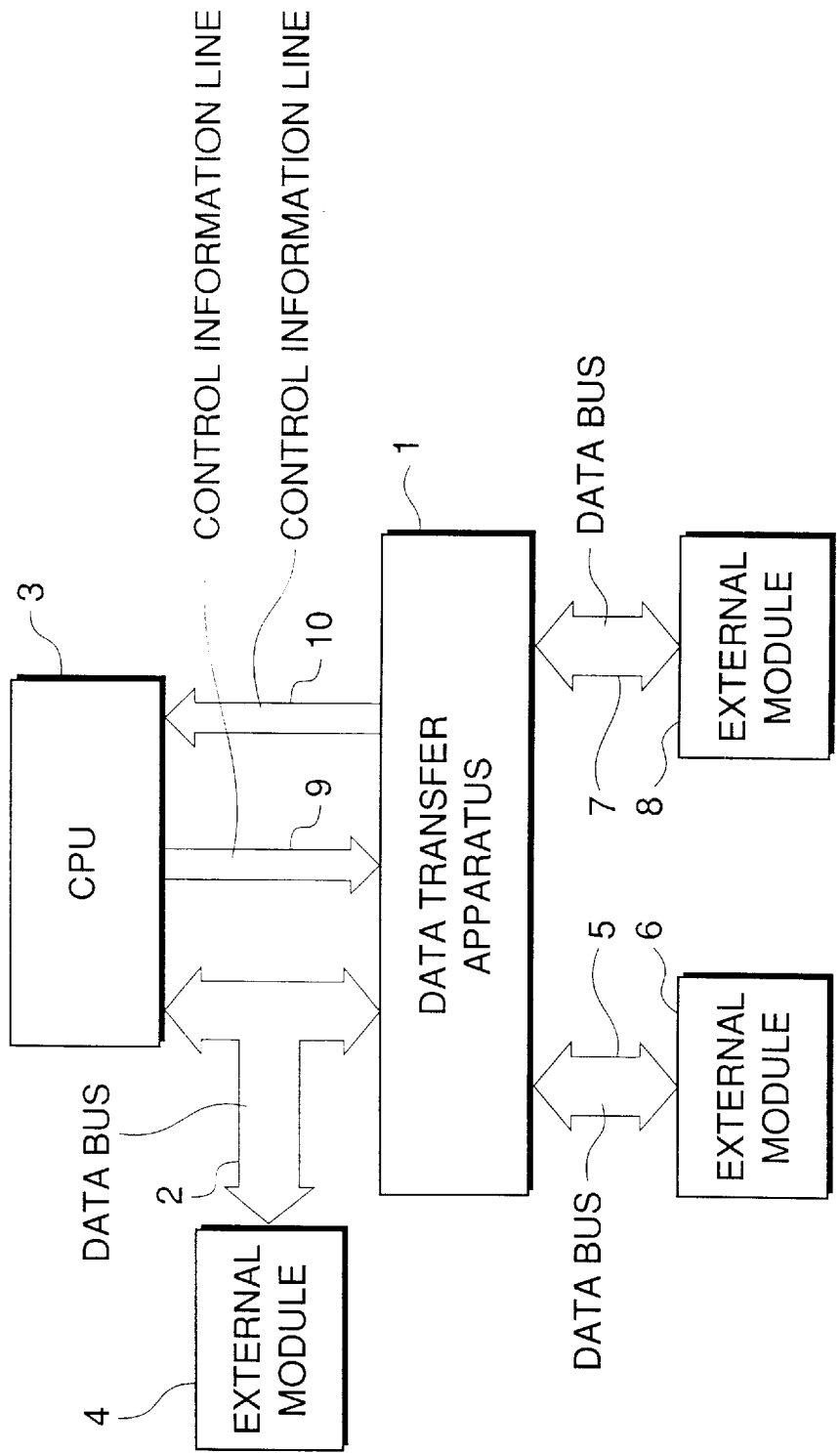
FIG. 1 is a block diagram schematically showing the whole arrangement of a DMA data transfer system incorporating a data transfer apparatus according to a first embodiment of the invention.

Referring first to FIG. 1, there is shown the whole arrangement of a DMA data transfer system incorporating a data transfer apparatus according to an embodiment of the invention.

In the figure, a data transfer apparatus 1 is connected to a CPU 3 and an external module 4 through a data bus 2, to an external module 6 through a data bus 5, and to an external module 8 through a data bus 7. The data transfer apparatus 1 is connected to the CPU 3 through control information lines 9 and 10 as well as through the data bus 2 such that a DMA transfer starting command is supplied from the CPU 3 to the data transfer apparatus 1 through the control information line 9, and information indicative of completion of a DMA transfer and a state of allotment of DMA channels of the data transfer apparatus 1 is supplied from the apparatus 1 to the CPU 3 through the control line 10.

When a command for starting a DMA block transfer (hereinafter sometimes abbreviated to "DMA transfer") is given by the CPU 3 through the control information line 9, the data transfer apparatus 1 selects two buses out of the data buses 2, 5 and 7, designated by DMA control parameters delivered from the CPU 3 through the data bus 2, to carry out DMA block transfer between two external modules connected to the selected data buses via the data transfer apparatus 1.

Figure 2:
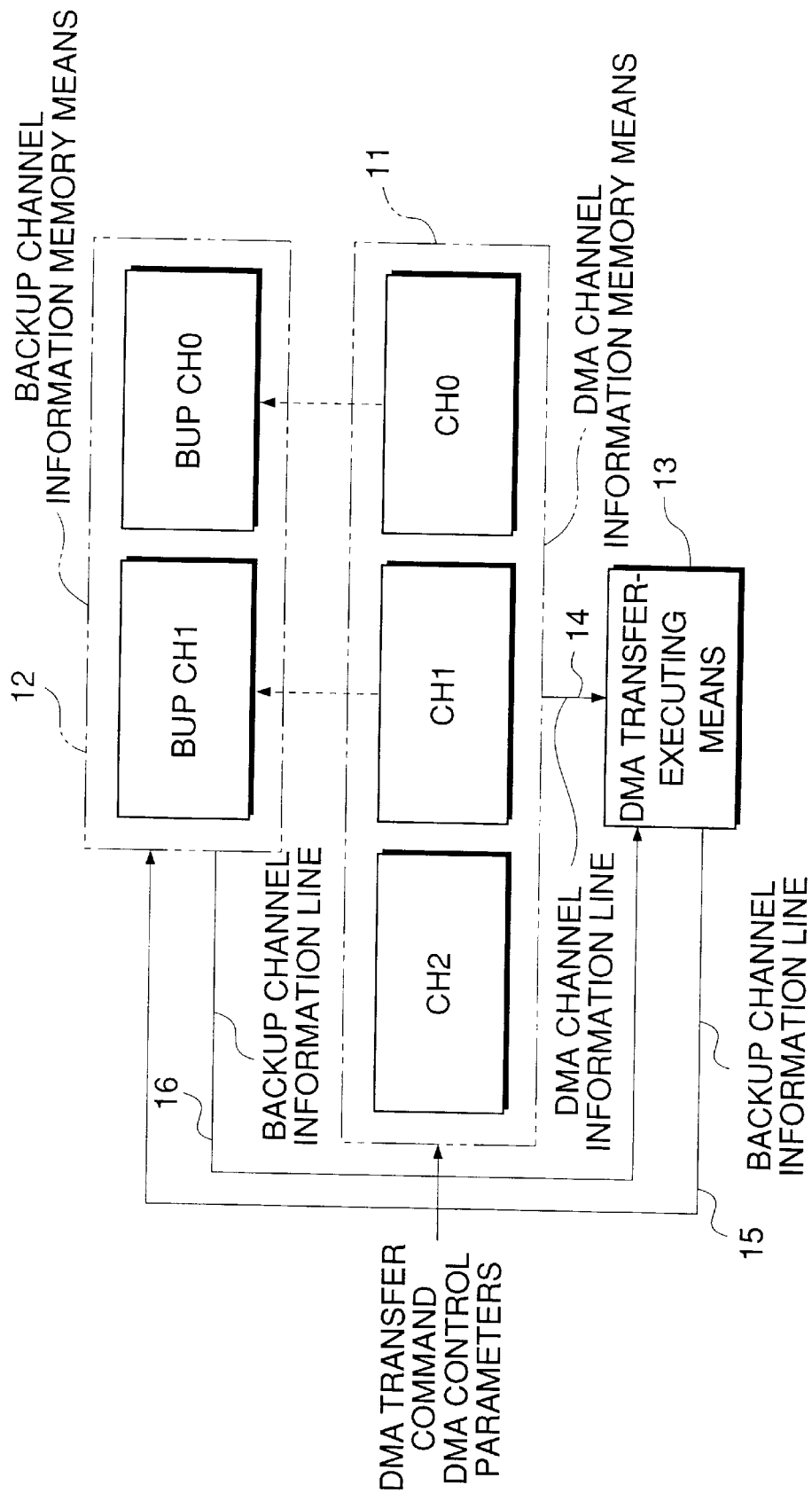
FIG. 2 is a block diagram schematically showing the arrangement of the data transfer apparatus appearing in FIG. 1.

FIG. 2 shows the arrangement of essential parts of the data transfer apparatus 1.

The data transfer apparatus 1 is comprised of a DMA channel information memory 11, a backup channel information memory 12, and a DMA transfer-executing section 13. The DMA channel information memory 11 stores DMA channel information including DMA transfer commands and DMA control parameters given by the CPU 3. The DMA control parameters include a source address SA, a destination address DA, and a number N of data items to be transferred, which are initial information concerning a DMA channel CHn to be started for DMA transfer.

The backup channel information memory 12 stores backup information including DMA control parameters which have been used for a DMA transfer through a DMA channel CHn by the DMA transfer-executing section 13, when the DMA block transfer through the DMA channel CHn is interrupted. These parameters include a source address SA and a destination address DA which have been used for the DMA transfer through the DMA channel CHn to be interrupted, and a number N of data items to be transferred, i.e., the residual amount of data, which are assumed when the transfer is interrupted.

The DMA transfer-executing section 13 carries out DMA transfer, based on DMA channel information given from the DMA channel information memory 11 through a DMA channel information line 14, or based on backup channel information given from the backup channel information memory 12 through a backup channel information line 16, and at the same time saves the DMA channel information stored in the DMA channel to be interrupted at the time of the interruption into a corresponding backup channel within the backup channel information memory 12 through a backup channel information line 15.

According to the present embodiment, three DMA channels CH0 to CH2 are provided for the DMA channel information memory 11, which have imparted thereto respective different priorities set in a relationship of CH2>CH1>CH0 according to the degree of urgency of data transfer to be carried out.

Further, backup channels BUPCH1 and BUPCH0 are provided for the backup channel information memory 12, which correspond, respectively, to the channels CH1 and CH0 exclusive of the channel CH2 having the highest priority. The DMA channels and backup channels are set in a relationship of priority of CH2>BUPCH1>CH1>BUPCH0>CH0.

Figure 3:
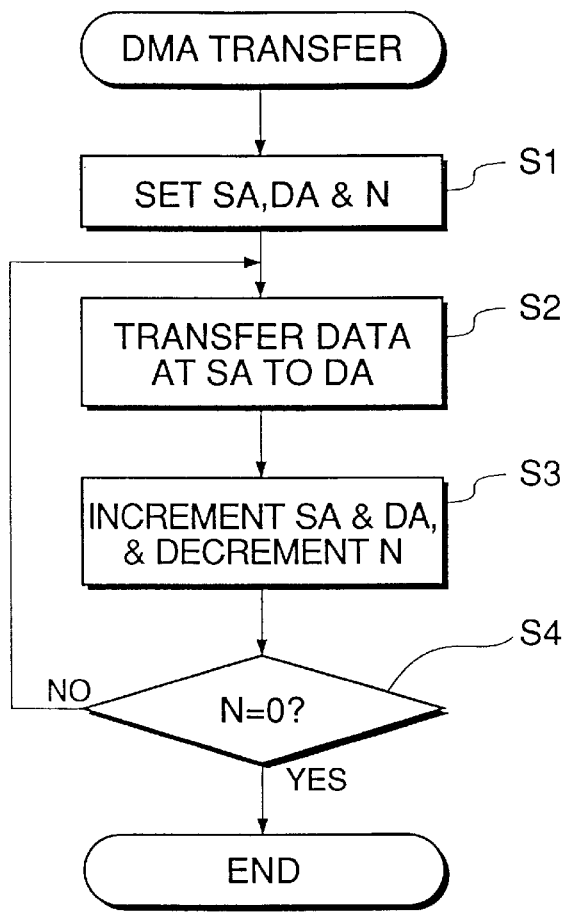
FIG. 3 is a flowchart showing a program for carrying out DMA block transfer of data according to the first embodiment.

FIG. 3 shows a program for carrying out DMA block transfer, which is executed in response to a command for DMA transfer issued from the CPU 3.

For example, when a command for DMA transfer through a certain DMA channel CHn is issued from the CPU 3, which instructs to carry out a DMA block transfer of data from the external module 6 to the external module 8, the DMA transfer-executing section 13 first sets DMA control parameters stored in the DMA channel CHn, i.e., sets the source address SA to an address value for the external module 6, the destination address DA to an address value for the external module 8, and the number N of data items to be transferred by the DMA transfer-executing section 13 to a value corresponding to the number of data items to be transferred, at a step S1. Then, the section 13 selects the data buses 5 and 6 corresponding to the set addresses SA and DA, and data are DMA-transferred from the external module 6 to the external module 8 through the selected buses 5 and 6, at a step S2. Then, the source address SA and the destination address DA 8 are incremented, and the number N of data items to be transferred is decremented, at a step S3.

Then, the DMA transfer-executing section 13 determines at a step S4 whether or not the number N of data items to be transferred is equal to 0. If the number N of data items to be transferred is equal to 0, the DMA block transfer is terminated. On the other hand, if the number N of data items to be transferred is not equal to 0, in order to continue the DMA block transfer, the program returns to the step S2, wherein data are further transferred from the external module 6 to the external module 8. Thereafter, the above processing is repeatedly carried out until the number N of data items to be transferred by the DMA transfer-executing section 13 becomes 0.

Figure 4:
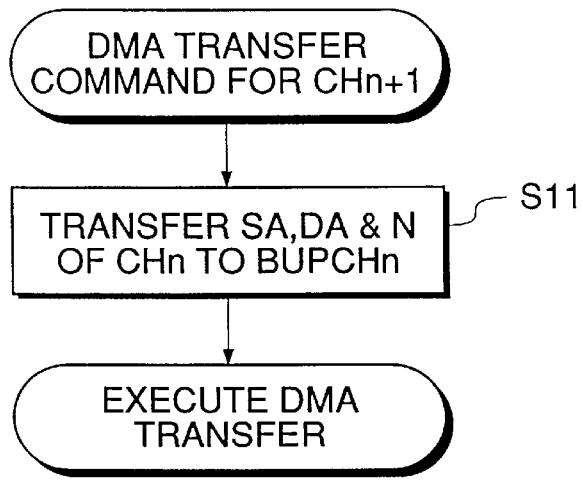
FIG. 4 is a flowchart showing a program for carrying out DMA block transfer of data when a DMA transfer command is issued for a DMA channel higher in priority than a DMA channel through which data is being transferred, according to the first embodiment.

When a command for DMA transfer through a DMA channel CHn+1 higher in priority than the DMA channel CHn is issued during the DMA transfer through the DMA channel CHn, as shown in FIG. 4, the source address SA, the destination address DA, and the number N of data items to be transferred, which assume respective values stored in the DMA channel CHn at this time point, are transferred to the backup channel information memory 12 and saved into a backup channel BUPCHn corresponding to the DMA channel CHn, at a step S11. Then, a DMA transfer through the channel CHn+1 is carried out according to the routine of FIG. 3 described above.

When the DMA block transfer is restarted based on the DMA control parameters saved in the backup channel BUPCHn, i.e., the backup information, the information saved in the backup channel BUPCHn is set to the DMA transfer-executing section 13 to restart the DMA transfer thereof.

Figure 5:
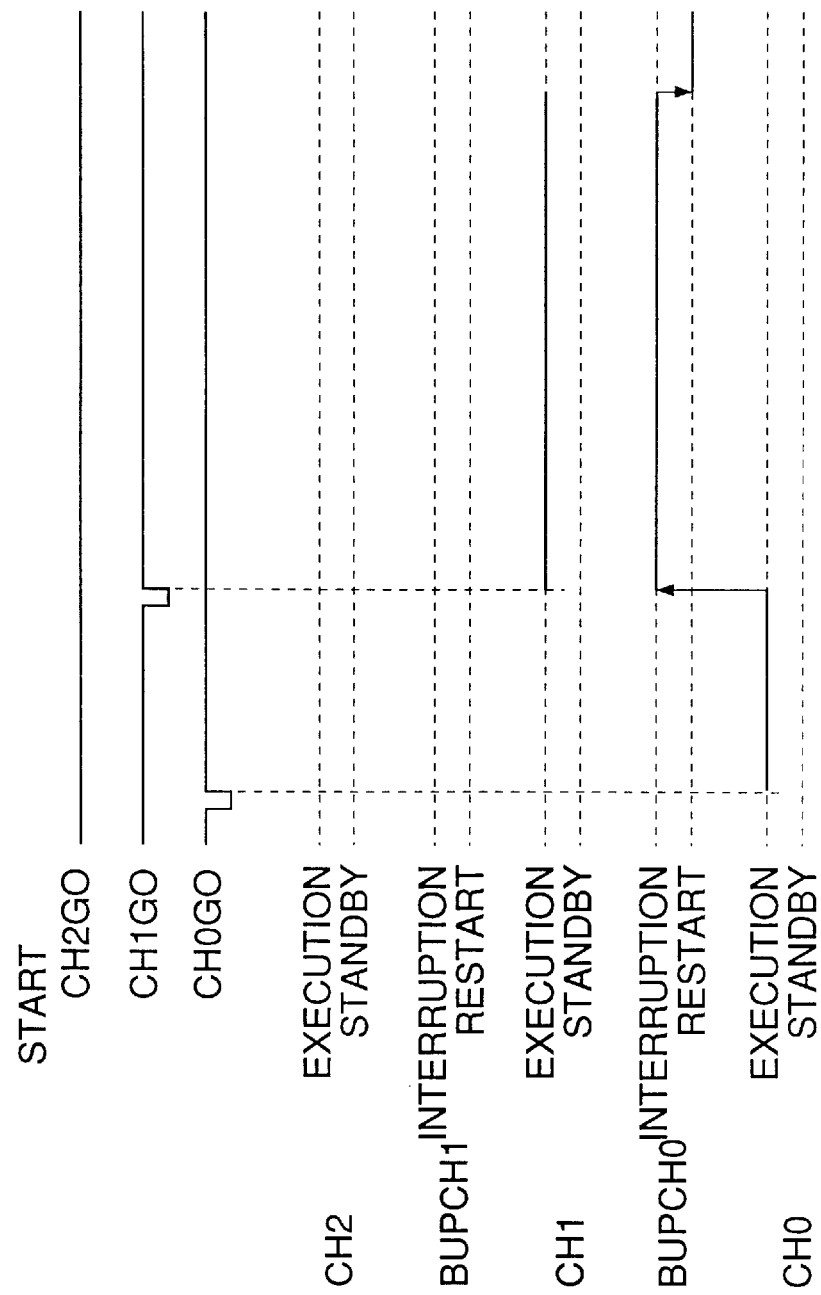
FIG. 5 is a timing chart showing an example of the relationship in timing between issue of commands for transfer of data through DMA channels and states of the DMA channels and backup channels.

FIG. 5 shows an example of the relationship in timing between issuance of commands CHnGO for data transfer through DMA channels and states of the DMA channels and backup channels assumed when a DMA transfer through the DMA channel CH1 higher in priority than the DMA channel CH0 is commanded during DMA transfer through the DMA channel CH0. More specifically, when a command CH1GO for DMA transfer through the DMA channel CH1 higher in priority is issued during DMA transfer through the DMA channel CH0, channel information of the DMA channel CH0 lower in priority is saved into the backup channel BUPCH0 to interrupt the DMA transfer through the DMA channel CH0, whereby a DMA transfer through the DMA channel CH1 is preferentially carried out. When the DMA transfer through the DMA channel CH1 is completed, the information saved in the backup channel BUPCH0 is set to the DMA transfer-executing section 13, to thereby restart the interrupted DMA transfer through the backup channel BUPCH0.

Figure 6:
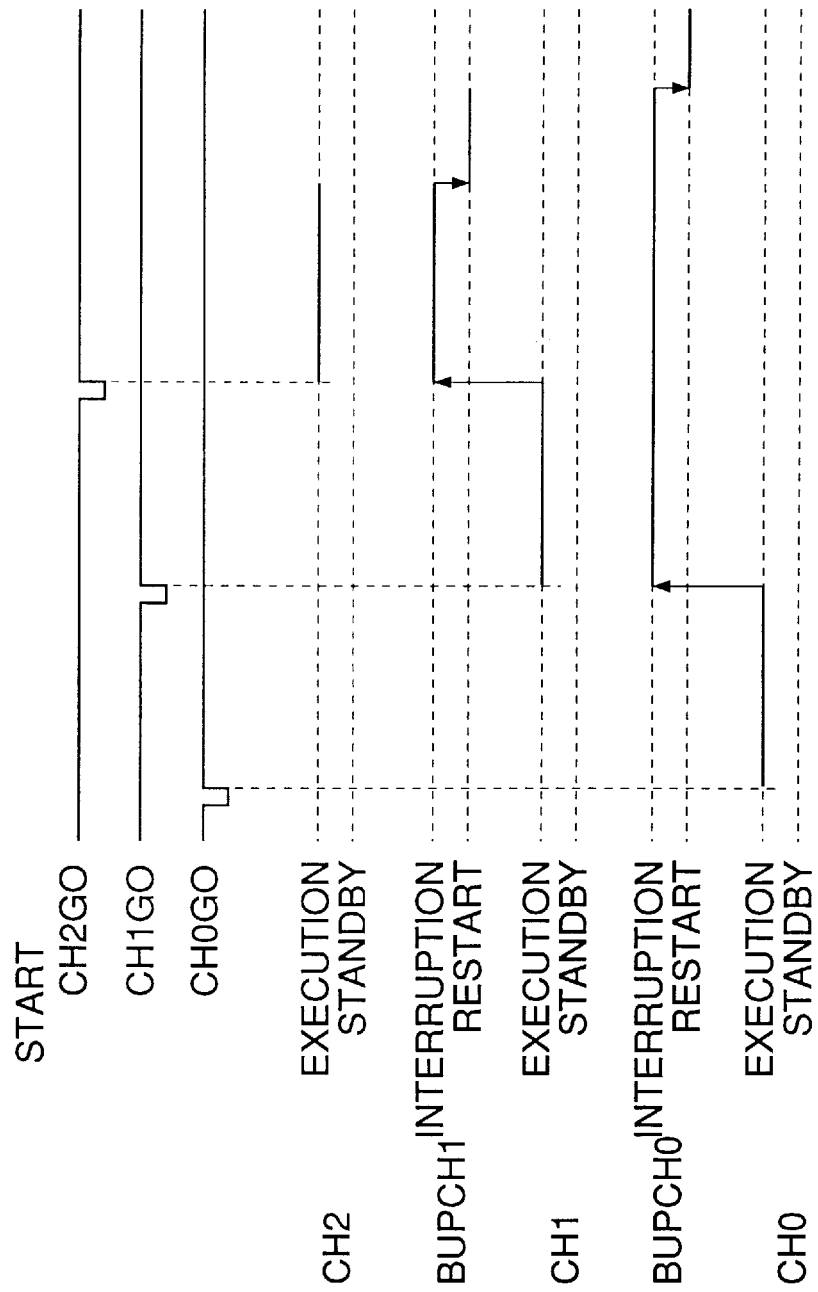
FIG. 6 is a timing chart showing another example of the relationship in timing between issue of commands for transfer of data through DMA channels and states of the DMA channels and backup channels.

FIG. 6 shows another example of the relationship in timing between issuance of commands CHnGO for data transfer through DMA channels and states of the DMA channels and backup channels assumed when a DMA transfer through the DMA channel CH1 higher in priority than the DMA channel CH0 is commanded and then a DMA transfer through the DMA channel CH2 even higher in priority than the DMA channel CH1 is commanded during the DMA transfer through the DMA channel CH0. More specifically, when a command CH1GO for DMA transfer through the DMA channel CH1 is issued during DMA transfer through the DMA channel CH0 lower in priority than the DMA channel CH1, channel information of the channel CH0 is saved into the backup channel BUPCH0 to interrupt the DMA transfer through the DMA channel CH0, whereby a DMA transfer through the channel CH1 is preferentially carried out. However, when a command CH2GO for DMA transfer through the DMA channel CH2 even higher in priority is issued, channel information of the DMA channel CH1 lower in priority than the DMA channel CH2 is saved into the backup channel BUPCH1 to interrupt the DMA transfer through the DMA channel CH1. After completion of the DMA transfer through the DMA channel CH2, the later interrupted transfer, i.e., the DMA transfer through the DMA channel CH1 is restarted through the backup channel BUPCH1 higher in priority than the backup channel BUPCH0, and then, after completion of the DMA transfer through the backup channel BUPCH1, the first interrupted transfer, i.e., the DMA transfer through the DMA channel CH0, is restarted through the backup channel BUPCH0. Thus, all the transfers commanded are completed.

Figure 7:
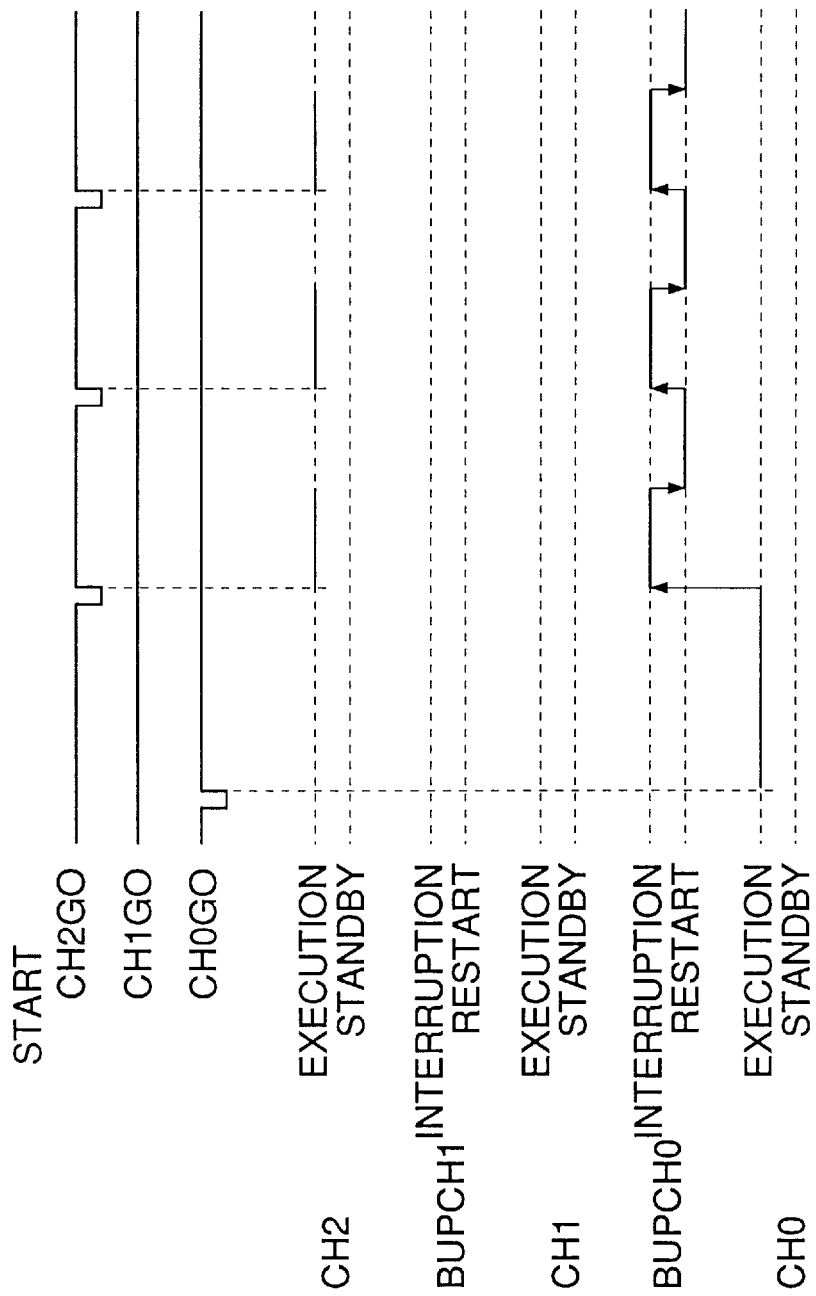
FIG. 7 is a timing chart showing still another example of the relationship in timing between issue of commands for transfer of data through DMA channels and states of the DMA channels.

FIG. 7 shows another example of the relationship in timing between issuance of commands CHnGO for data transfer through DMA channels and states of the DMA channels and backup channels assumed when DMA transfers through the DMA channel CH2 higher in priority than the DMA channel CH0 are consecutively commanded during DMA transfer through the DMA channel CH0. More specifically, if a command CH2GO for DMA transfer through the DMA channel CH2 is issued during DMA transfer through the DMA channel CH0, channel information of the DMA channel CH0 is saved into the backup channel BUPCH0, to thereby interrupt the transfer through the DMA channel CH0. After completion of the data transfer through the DMA channel CH2, the interrupted data transfer through the DMA channel CH0 is restarted through the backup channel BUPCH0. Then, if another command CH2GO for DMA transfer through the DMA channel CH2 is issued again during the transfer through the backup channel BUPCH0, channel information set in the DMA transfer-executing section 13 at this time point is saved into the backup channel BUPCH0 to interrupt the transfer through the backup channel BUPCH0, whereby DMA transfer through the DMA channel CH2 is preferentially carried out. Thereafter, the above processing is repeatedly carried out.

Figure 8:
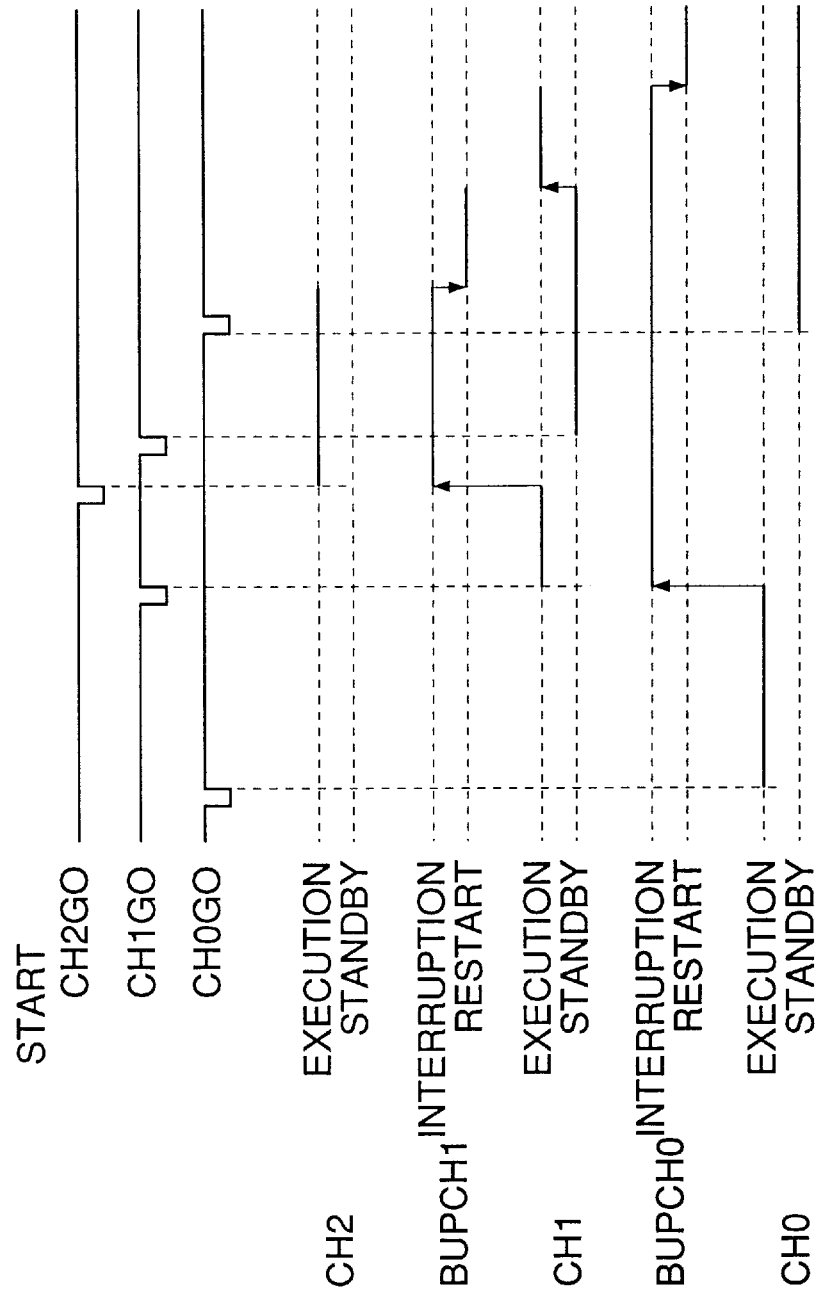
FIG. 8 is a timing chart showing a further example of the relationship in timing between issue of commands for transfer of data through DMA channels and states of the DMA channels and backup channels.

FIG. 8 shows a further example of the relationship in timing between issuance of commands CHnGO for data transfer through DMA channels and states of the DMA channels and backup channels assumed when DMA transfers through the DMA channels CH0 and CH1 are commanded during interruption of DMA transfers through the same DMA channels CH0 and CH1, which interruption has been caused by preferential execution of a DMA transfer through the DMA channel CH2 having the highest priority. More specifically, when a command CH1GO for DMA transfer through the DMA channel CH1 higher in priority than the DMA channel CH0 is issued during DMA transfer through the DMA channel CH0, channel information stored in the DMA channel CH0 is saved into the backup channel BUPCH0 to interrupt the transfer through the DMA channel CH0, whereby a DMA transfer through the DMA channel CH1 is preferentially carried out. Then, if a command CH2GO for DMA transfer through the DMA channel CH2 even higher in priority than the DMA channel CH1 is issued during the DMA transfer through the DMA channel CH1, channel information of the DMA channel CH1 lower in priority than the DMA channel CH2 is saved into the backup channel BUPCH1 as well, to interrupt the transfer through the DMA channel CH1, whereby a DMA transfer through the DMA channel CH2 is carried out. On this occasion, even if a new command CH1GO for DMA transfer through the DMA channel CH1 is issued, a transfer through the DMA channel CH1 lower in priority than the backup channel BUPCH1 is kept waiting. Therefore, after completion of the transfer through the DMA channel CH2, the transfer through the DMA channel CH1 is first restarted through the backup channel BUPCH1, and then the transfer through the channel CH1 which has been kept waiting is carried out. Similarly, when the transfer through the DMA channel CH1 is completed, the first interrupted transfer is restarted through the backup channel BUPCH0, and then a transfer through the DMA channel CH0 which has been kept waiting is carried out.

According to the present embodiment, as described above, the DMA channels CH0 to CH2 are set in the relationship of priority of CH2>CH1>CH0, and when a command for DMA transfer through a DMA channel CHn+1 higher in priority than a DMA channel CHn is issued during a DMA transfer through the DMA channel CHn, the DMA transfer through the DMA channel CHn is interrupted, whereby a DMA transfer through the DMA channel CHn+1 higher in priority is preferentially carried out. As a result, DMA transfer of data with a high degree of urgency is promptly carried out without waiting.

Further, according to the present embodiment, a higher priority than that of a DMA channel CHn is imparted to a corresponding backup channel BUPCHn into which DMA channel information of the DMA channel CHn is saved, and when a DMA transfer through a DMA channel having a higher priority than that of the backup channel BUPCHn is completed, DMA transfers through the backup channel BUPCHn and the DMA channel CHn are successively restarted according to the priorities imparted thereto. As a result, even if a further command for DMA transfer through the DMA channel CHn which is kept waiting for DMA transfer is generated, restarting of the DMA transfer through the DMA channel CHn which has been interrupted by execution of a DMA transfer through a higher priority DMA channel is started with transfer of a data block which was about to be transferred at the last time of interruption of the DMA transfer through the DMA channel CHn, which makes it possible to achieve efficient and prompt interruption and restarting of the DMA block transfer.

Figure 9:
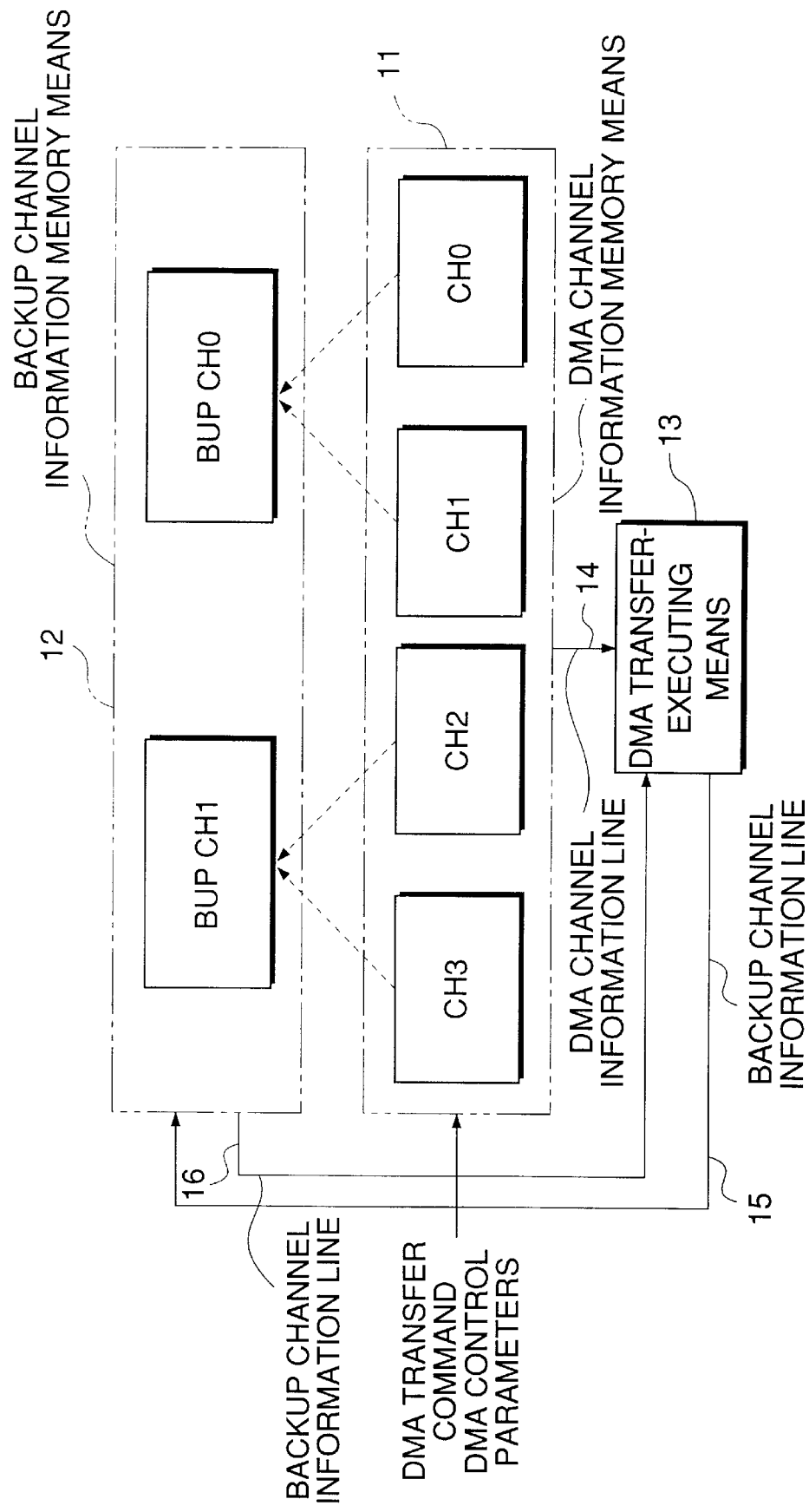
FIG. 9 is a block diagram schematically showing the arrangement of a data transfer apparatus according to a second embodiment of the invention.

FIG. 9 shows the arrangement of essential parts of the data transfer apparatus 1 according to a second embodiment of the invention.

According to the present embodiment, there are provided four DMA channels CH0 to CH3 which are set in a relationship of priority of CH3>CH2>CH1>CH0 according to the degree of urgency of the data transfer, and the four DMA channels are divided into two groups, i.e., a group of channels CH0 and CH1, and a group of channels CH2 and CH3. Backup channels BUPCH0 and BUPCH1 are provided, which correspond, respectively, to the two groups. The DMA channels and back up channels are set in a relationship of priority of BUPCH1>CH3>CH2>BUPCH0>CH1>CH0.

Figure 10:
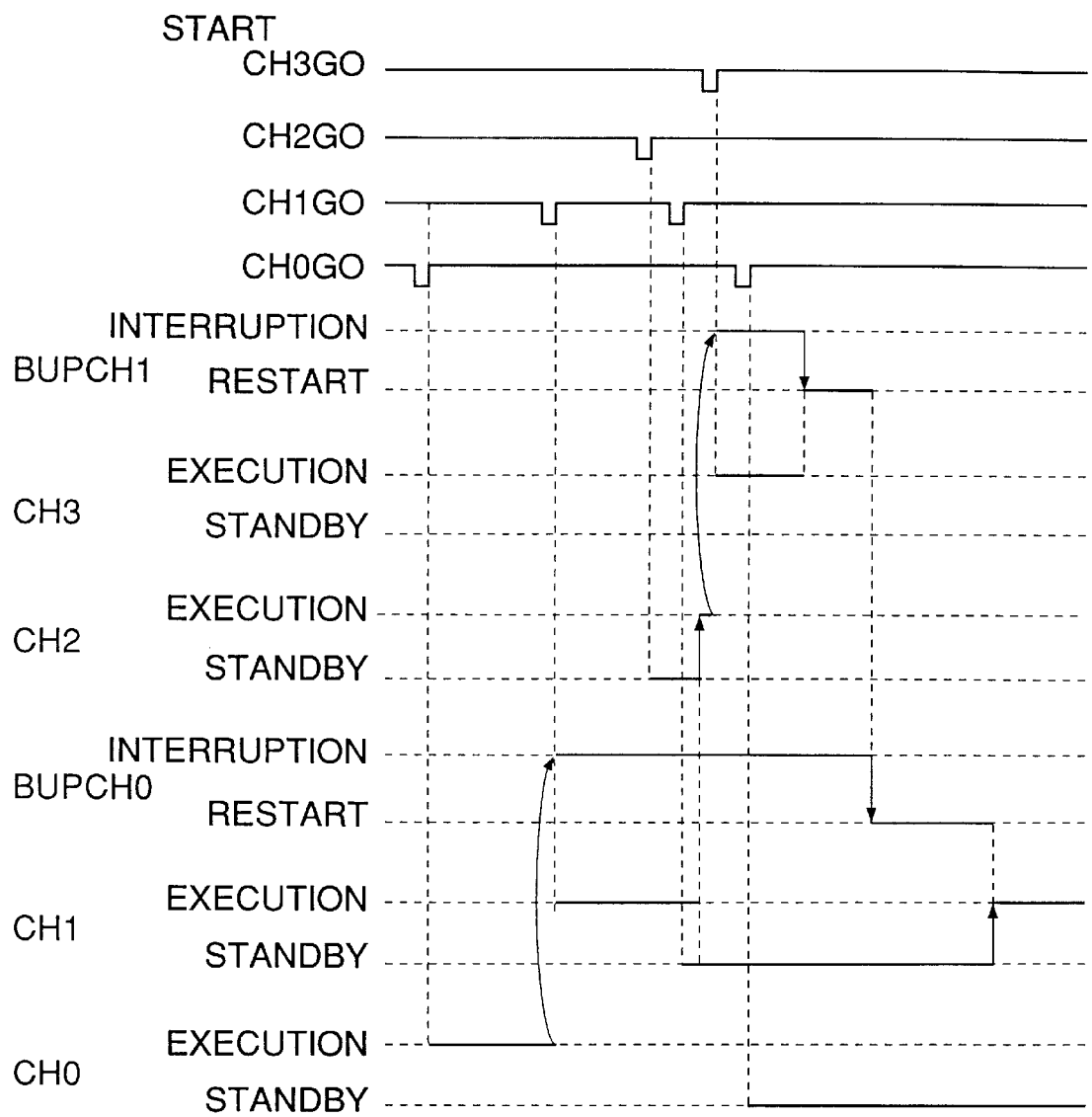
FIG. 10 is a timing chart showing the relationship in timing between issue of commands for transfer of data through DMA channels and states of the DMA channels and backup channels.

As is shown in FIG. 10, when a DMA transfer through the DMA channel CH1 higher in priority than the DMA channel CH0 is commanded during a DMA transfer through the DMA channel CH0, channel information of the DMA channel CH0 is saved into the corresponding backup channel BUPCH0 to interrupt the DMA transfer through the DMA channel CH0, whereby the DMA transfer through the DMA channel CH1 higher in priority is carried out. During the DMA transfer through the DMA channel CH1, if a command for DMA transfer is issued for the DMA channel CH2 having an even higher priority, channel information of the channel CH1 cannot be saved into the backup channel BUPCH0 since the channel information of the DMA channel CH0 has already been saved into the backup channel BUPCH0, and therefore the transfer through the DMA channel CH1 is continued. Consequently, the DMA transfer through the DMA channel CH2 with the highest priority is suspended for a short time period until the transfer through the DMA channel CH1 is completed. Except for this, the DMA transfer according to the present embodiment is carried out in a manner identical with that carried out in the first embodiment described hereinbefore. In this embodiment, when a further command for DMA transfer through one channel is issued during a DMA transfer through the same channel, the new DMA transfer is kept waiting.

According to the present embodiment, as described above, the DMA channels are divided into groups and the DMA channels of the same group share the same backup channel. As a result, the manufacturing cost can be curtailed.

Figure 11:
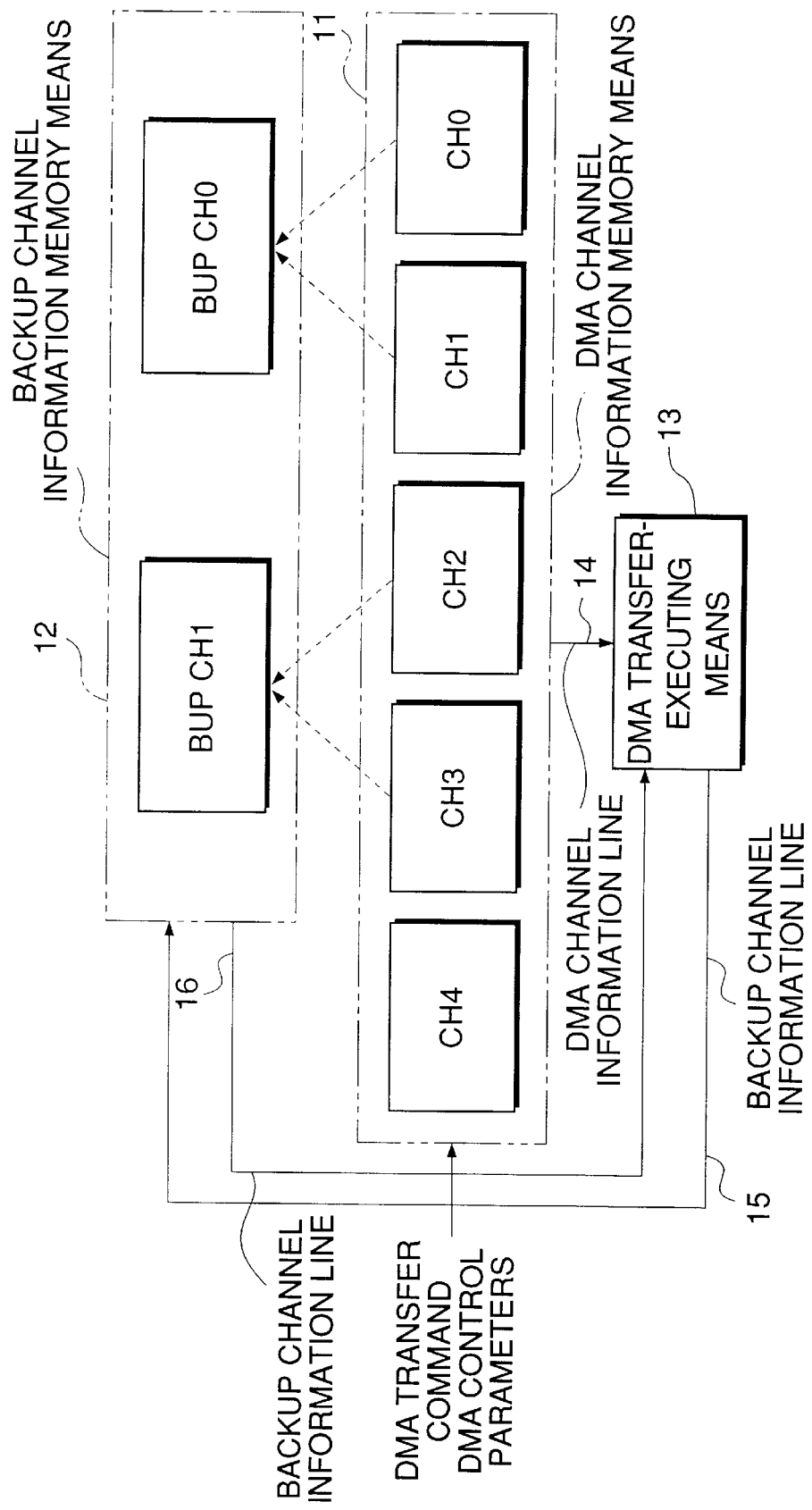
FIG. 11 is a block diagram showing the arrangement of a data transfer apparatus according to a third embodiment of the invention.

FIG. 11 shows the arrangement of essential parts of the data transfer apparatus 1 according to a third embodiment of the invention.

According to the present embodiment, five DMA channels CH0 to CH4 are provided, which are set in a relationship of priority of CH4>CH3>CH2>CH1>CH0 according to the degree of urgency of the data transfer, and the channels CH0 to CH3 exclusive of the channel CH4 having the highest priority are divided into groups, i.e., a group of channels CH0 and CH1, and a group of channels CH2 and CH3. Further, backup channels BUPCH0 and BUPCH1 are provided, which correspond, respectively, to the group of the channels CH0 and CH1 and the group of the channels CH2 and CH3. The DMA channels and the backup channels are set in a relationship of priority of CH4>BUPCH1>CH3>CH2>BUPCH0>CH1>CH0.

Figure 12:
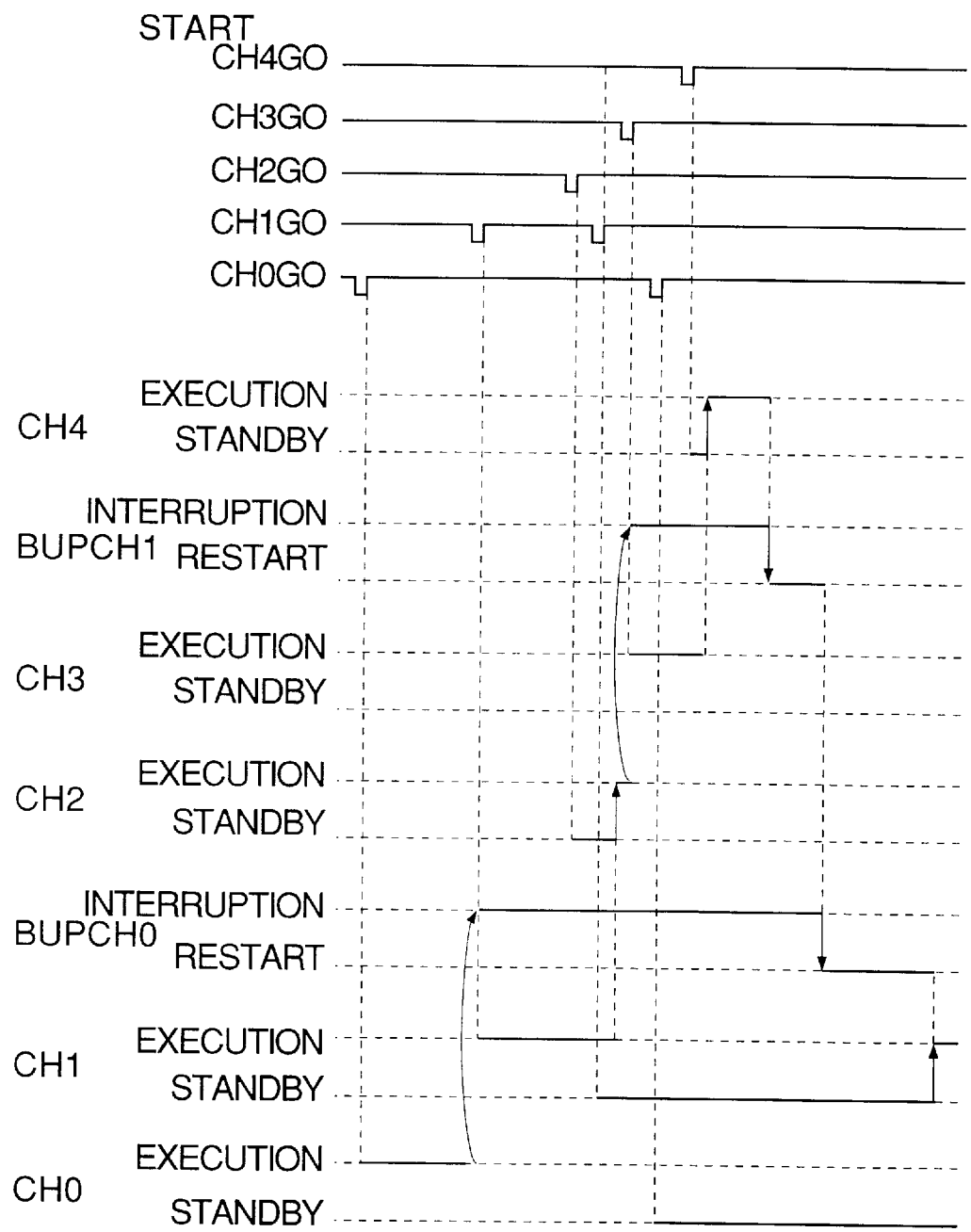
FIG. 12 is a timing chart showing an example of the relationship in timing between issue of commands for transfer of data of DMA channels and states of the DMA channels and backup channels.

As is shown in FIG. 12, according to the present embodiment as well, when contention occurs between two or more of the DMA channels, the channels assume states similar to the channels in the second embodiment. A backup channel need not be provided for the DMA channel CH4 having the highest priority.

What is claimed is:

1. A data transfer apparatus comprising:

a plurality of direct memory access (DMA) channels having respective different priorities imparted thereto;

at least one backup channel information memory for saving control information necessary for a restart of an interrupted DMA transfer through one of the plurality of the DMA channels, each of the at least one backup channel information memory being associated with at least one of the plurality of DMA channels; and control means responsive to a transfer command for commanding a DMA transfer through one of the plurality of DMA channels, wherein when a transfer command interrupts an execution of a DMA transfer through one of the plurality of DMA channels having a lower priority than the priority of one of the plurality of DMA channels used by the interrupting transfer command, the control means executes the following steps:

1) interrupting the DMA transfer through the DMA channel having the lower priority;
2) saving control information of the interrupted DMA transfer in one of the at least one backup channel information memory associated with the DMA channel having the lower priority;
3) executing the interrupting transfer command;
4) reading the saved control information of the interrupted DMA transfer from the backup channel information memory associated with the DMA channel having the lower priority; and
5) restarting the interrupted DMA transfer through the DMA channel having the lower priority after finishing the execution of the interrupting transfer command.

2. The data transfer apparatus of claim 1, wherein the control means is responsive to another transfer command issued while executing the interrupting transfer command such that the control means executes the another transfer command and interrupts the interrupting transfer command if the another transfer command uses one of the plurality of DMA channels having higher priority than the DMA channel used by the interrupting transfer command.

3. The data transfer apparatus of claim 1, wherein the at least one backup channel information memory comprises a plurality of backup channel memories, and each of the plurality of DMA channels is associated with each of the plurality of backup channel memories except for one of the plurality of DMA channels having the highest priority.

4. The data transfer apparatus of claim 1, wherein the plurality of DMA channels is divided into at least two separate groups of DMA channels, the data transfer apparatus comprises a plurality of backup channel information memories at least equal in number to the number of the at least two separate groups of DMA channels, and each of the plurality of backup channel information memories is associated with one of the at least two separate groups of DMA channels, respectively.

5. The data transfer apparatus of claim 1, wherein the plurality of DMA channels is divided into at least two separate groups of DMA channels except for the DMA channel having the highest priority, the data transfer apparatus comprises a plurality of backup channel information memories at least equal in number to the number of the at least two separate groups of DMA channels, and each of the plurality of backup channel information memories is associated with one of the at least two separate groups of DMA channels, respectively.

* * * * *